(12) United States Patent
Ladyansky (10) Patent No.: US 6,758,404 B2
(45) Date of Patent: Jul. 6, 2004

(54) MEDIA CIPHER SMART CARD

(75) Inventor: Stephen Joseph Ladyansky, Philadelphia, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/922,325

(22) Filed: Aug. 3, 2001

(65) Prior Publication Data

US 2003/0024994 A1 Feb. 6, 2003

(51) Int. Cl.[7] .............................................. G06K 19/06
(52) U.S. Cl. ........................ 235/492; 235/487; 235/375
(58) Field of Search ................................. 235/380, 375, 235/487, 492; 320/106, 110, 107, 112, 113, 115, 116

(56) References Cited

U.S. PATENT DOCUMENTS

| | | | |
|---|---|---|---|
| 5,244,840 A | * 9/1993 | Kodai et al. | 29/841 |
| 5,314,765 A | 5/1994 | Bates | 429/194 |
| 5,445,906 A | 8/1995 | Hobson et al. | 429/162 |
| 5,569,520 A | 10/1996 | Bates | 429/162 |
| 5,705,293 A | 1/1998 | Hobson | 429/162 |
| 5,977,745 A | * 11/1999 | Ryan | 320/106 |
| 6,019,284 A | * 2/2000 | Freeman et al. | 235/375 |

OTHER PUBLICATIONS

Ross Anderson et al., "Tamper Resistance—A Cautionary Note", Commerce Proceedings, Oakland, California, Nov. 18–21, 1996, pp. 1–11.
"Comparisons of Several Thin–Film Lithium Batteries", http://www.ssd.ornl.gov/Programs/BatteryWeb/Comparisons.html, 3 pages, no date.
"Lithium Batteries with Crystalline LiCoO2 Cathodes," http://www.ssd.ornl.gov/Programs/BatteryWeb/cLiCoO2.html, 2 pages, no date.
"Thin Film Lithium–Ion Batteries," http://www.ssd.ornl.gov/Programs/BatteryWeb/Lithium–ion.html, 4 pages, no date.
"Batteries with Nanocrystalline LixMn2–yO4 Cathodes", http://www.ssd.ornl.gov/Programs/BatteryWeb/aLiMn2O4.html, 2 pages, no date.
""Lithium–free" Thin Film Batteries," http://www.ssd.ornl.gov/Programs/BatteryWeb/lifree.htm, 2 pages, no date.
"Thin Films for Advanced Batteries," http://www.ornl.gov/ORNLReview/rev25–2/net425.html, 9 pages, no date.
"Technology Transfer", http://www.ornl.gov/ORNLReview/rev28–1/text/tec.htm, 3 pages, no date.
Yu, Xiaohua et al., "A Stable Thin–Film Lithium Electrolyte: Lithium Phosphorous Oxynitride," J. Electrochem. Soc., vol. 144, No. 2, Feb. 1997, pp. 524–532.

* cited by examiner

*Primary Examiner*—Karl D. Frech
(74) *Attorney, Agent, or Firm*—Mayer Fortkort & Williams, PC; Michael P. Fortkort (57) ABSTRACT

A chip card is provided which is equipped with a thin film battery, such as those that utilize a LiPON electrolyte. Since the battery does not require venting, it can be sealed within the card, thereby making the card more tamper resistant. Moreover, the terminals of the battery and memory are encased in an epoxy resin, and a volatile memory type is employed. This improves the resistance of the card toward common tampering schemes involving the use of sulfuric acid or other mineral acids. In particular, if such acids are used in an attempt to access the memory module in order to tamper with the card, they will dissolve the epoxy resin around the battery terminals, resulting in a short circuit and erasing the memory contents of the card.

13 Claims, 2 Drawing Sheets

MEDIA CIPHER SMART CARD

BACKGROUND OF THE INVENTION

The present invention relates generally to methods and apparatuses for paying for goods and services, and more particularly to a method and apparatus for paying for goods and services using a credit-card having embedded memory and logic processing capability, also known as a smart card The history of smartcard technology originated with the concept of installing computer memory on a plastic card, which led to the development of the first chip cards in the mid-1970s. Early chip cards were based on EEPROM technology (electrically erasable programmable read-only memory) and featured fixed digital logic circuits. These cards, known as memory cards, found initial applications as healthcare ID cards and telephone payment cards.

In order to attract a worldwide user base, however, chip cards had to offer a greater range of features and applications to consumers than were already available through inexpensive magnetic strip cards, such as those employed as standard credit cards, which relied upon the concept of storing information on a magnetic strip. One possible area of differentiation was the provision of improved security, since problems with fraud had persisted for years in the credit card industry. This was due, in part, to the fact that the memory contents of a stolen magnetic strip card could be read and copied into counterfeit cards using relatively unsophisticated equipment.

Consequently, chip card developers began to look for ways to increase the chip's processing power, to reduce the amount of time it took for information to be transferred between the card and the reader and, most importantly, to enhance the data security of the card. These efforts led to the development of the smartcard, a chip card with a microcontroller incorporated into it. The microcontroller and its associated software provided a platform for a wide range of benefits and, in particular, allowed the smartcard to become a formidable barrier against credit and bank card fraud. Unlike a conventional credit card, a smartcard equipped with a microcontroller has the ability to encrypt information and store it in areas of the card that are designed to be unreadable. This helps prevent unauthorized reading and subsequent theft of the data. The effect of the smartcard from a security standpoint has been profound; in France, for example, where smartcards have been in public use since 1992, credit and bankcard fraud has been reduced dramatically.

There is, nonetheless, a continuing need to provide chip cards with improved security features, since the tools available to perpetrators of fraud have become more sophisticated. Moreover, a number of smartcards previously thought to be tamperproof have been successfully hacked. Thus, in a paper by R. Anderson and M. Kuhn entitled "Tamper Resistance—A Cautionary Note" and published by the USENIX Association in *The Second USENIX Workshop on Electronic Commerce Proceedings*, Oakland, Calif., pp. 1–11 (Nov. 18–21, 1996), the authors concluded that "smartcards are broken routinely, and even a device that was described by a government signals agency as 'the most secure processor generally available' [the Dallas Semiconductor DS5000 series] turns out to be vulnerable . . ." Indeed, the authors describe in detail methodologies that may be employed to successfully attack various smartcards, including the DS5000 series. While some of these techniques require sophisticated (though increasingly available) equipment and skilled hackers to implement, many of these methodologies also involve rudimentary techniques that require only inexpensive, commonly available materials and equipment. One such technique was reported to involve tools and materials that were obtained for $30 at a pharmacy.

Generally speaking, card fraud is facilitated if a person intent on tampering with a chip card can gain access to the card's components without destroying them in the process. This is due, in part, to the fact that some of the security features of the card rely on certain components remaining inaccessible. For example, the memory components of a chip card cannot be read and decrypted if they are not accessible in the first place. Hence, the security of a chip card can be improved by ensuring that the card's internal components remain inaccessible.

In this respect, the battery system of a chip card is a potential weakness, because conventional battery systems require openings for the release of gases that are formed during their use. These openings provide an access point that can be exploited by someone intent on tampering with the card. On the other hand, the battery system is an important component of modern chip cards, since it frees the card from reliance on an external power source (which itself entails security risks) and enables other features, such as internal clocks, that increase the utility of the card. There is thus a need in the art for a chip card that overcomes this infirmity. In particular, there is a need in the art for a chip card equipped with a battery system that does not require venting or which can otherwise be made inaccessible.

One common technique of attacking a smartcard involves the physical removal of the plastic backing from the smart card by means of a sharp knife or lathe so as to expose the chip module. The chip module is typically encased in a coating of epoxy resin, which can be readily removed by treatment with fuming nitric acid followed by shaking in acetone. After removal of the epoxy layer, the chip module, which is still fully functional, may be exposed to microprobing experiments to determine the memory contents. There is thus a need in the art for a chip card that is resistant to this type of attack.

The present invention is therefore directed to the problem of developing a method and apparatus for powering a smart card, charging the power source and protecting the smart card from tampering without overloading the smart card with hardware and processing capability.

SUMMARY OF THE INVENTION

In one aspect, the present invention relates to a chip card comprising a thin film battery that does not require venting. The battery preferably employs a solid-state electrolyte such as LiPON. Such a card is advantageous in that the battery may be hermetically sealed inside of the card, thereby making the card more tamper resistant. By contrast, prior art chip cards which rely on conventional battery systems must provide one or more openings for the venting of off-gases, which openings can be exploited for the purposes of tampering with the card.

In another aspect, the present invention relates to a chip card comprising a substrate, a volatile memory device (such as an SRAM device) disposed on the substrate, and a battery which is in electrical contact with the memory device by way of first and second conductive elements which have opposite polarity. The memory device, and those portions of the first and second conductive elements in the vicinity of the memory device, are encapsulated in an epoxy resin. Consequently, if an attempt is made to remove the epoxy resin from the memory device (or from a chip module which includes the memory device) by exposing the device to nitric acid, the epoxy resin will also be removed from the first and second conductive elements. Since nitric acid is a highly conductive medium, this will result in a short circuit of the battery and subsequent disruption in the power supply. Since the memory employed in the card is volatile, the disruption in the power supply will purge the memory, thereby rendering the card useless for the purposes of fraud.

According to another aspect of the present invention, a method and apparatus for charging the battery is provided. In particular, one embodiment employs a digital pulse output directly from a digital integrated circuit, such as a micro controller or microprocessor, to trickle charge the battery, whenever the device is connected to an external power source. By coupling the battery directly to the digital device, analog circuit devices are avoided, thereby avoiding the concomitant cost and real estate associated with such devices.

According to another aspect of the present invention, the microprocessor uses a pseudorandom sequence of pulses to trickle charge the battery. This pseudorandom sequence creates emissions that tend to mask the emissions output by other parts of the microprocessor, which emissions could be used to fraudulently gain access to the smart card in a reverse engineering process.

DETAILED DESCRIPTION

Overview

The chip cards of the present invention feature a new battery system that renders the card more resistant to tampering. In particular, the cards are equipped with a battery system that does not require venting or which can otherwise be made inaccessible. Hence, these cards are more tamper resistant than cards equipped with conventional batteries that require openings in the card for venting purposes.

Chip cards of various designs may be made in accordance with the present invention. However, most of these designs will include a semiconductor die, a module package, software, and the card chassis itself. The card chassis may include such items as printing, embossing, texturizing, magnetic striping, personalizations, decorations, dyes, pigments, and holograms. The chip cards can be either memory or microcontroller-based. They may be configured to exchange information through contact with a reader, or may be equipped with means for communicating in a wireless fashion. For example, the chip cards may be equipped with a miniaturized radio modem for sending and receiving data via a radio frequency (RF) transmission.

The core of the chip card is typically the semiconductor or chip. As noted above, the chip may be a microcontroller chip or a memory chip, and will typically be provided in one of three forms: a die form, a wafer form, or as a packaged module. The chip software will usually be installed at the time of manufacture, and typically consists of the card operating system and an application that is generally provided by the issuer (e.g., a bank). The card is then sold to the issuer, who in turn provides it to the consumer.

If the chip is a microcontroller chip, it may be provided with contact capabilities, contact-less capabilities, or both. A microcontroller adapted for contact-less transactions allows such transactions to match the security offered by contact chip cards, thereby facilitating use of the card in credit, debit, electronic purse, and electronic airline or public transport ticketing applications.

Chip Card Configuration

Figure 1:
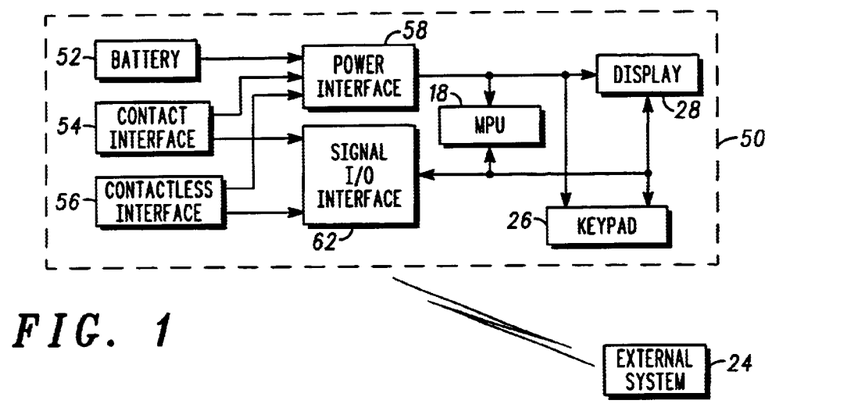
FIG. 1 is a schematic diagram of the circuitry of a first embodiment of a chip card made in accordance with the present invention.

The configuration of a typical chip card in accordance with the present invention may be understood with reference to the specific embodiment depicted in the block diagram of FIG. 1. This card 50 is designed to allow information stored on the card to be verified and/or accessed without requiring connection or coupling of the card to an external system. This particular card includes a keypad 26 and display 28, both of which are coupled to a controller or microprocessing unit (MPU) 18. The MPU stores data in the memory, preferably after first encrypting it. This particular card has the advantage of allowing the individual user to conveniently access data stored within the MPU via the keypad and the display. For example, the user may enter input data into the card via the keypad, and data returned from the smartcard may be viewed on the display.

The chip card additionally includes a power source that takes the form of a battery 52 for providing power to the electronics within the card. The battery will typically include first and second terminals of opposite polarity. In some embodiments, the power source is configured to maintain data in a volatile memory system only so long as the power source is connected to the volatile memory system. Such a configuration allows the memory to be wiped clean if the power supply is interrupted for any reason, thereby making the card more tamper resistant. As explained below, the power source is preferably a LiPON battery or other thin film battery that does not require venting.

The card also includes a contact interface 54 and/or contact-less interface 56 and a signal input/output interface 62 for independently or selectively providing communication between the card and an external system 24. Communications between the card and the external system may occur by signals coming into contact with the smartcard via the contact interface, or by wireless signals, such as radio frequency signals, optical signals or capacitive or inductive coupled signals, being transmitted or received by the card via the contact-less interface. The power interface 58 also provides power to the MPU, the keypad and the display via power bus 60 by selectively providing power from the battery or from the external system via the contact interface or the contact-less interface.

The flexibility of the smart card may be maintained through proper battery selection. Thus, as noted above, the battery may take the form of a flexible thin film material, which may be mounted to the core laminate of the smart card and may be electrically coupled by conductors, such as copper track, in a parallel or series combination. As a result of this flexibility, the card may be stored in the user's pocket, billfold, or another such places without being damaged.

The display 28 is typically liquid crystal display (LCD), although the use of other types of displays is also contemplated. For simple smartcards, the display may take the form of a single character, or a small single line display, for displaying only one data item, for example, the amount left on a prepaid card. However, for more expensive and elaborate smartcards, the display may take the form of a multiple line alphanumeric LCD display for executing menu-driven applications between the card and the user. The flexibility of the smart card may be maintained even with the use of the display. Thus, for example, the display may take the form of a flexible LCD. The display may also comprise individual LCD elements, which are mounted to the core laminate of the card and connected by conductors to the segment drivers. In the latter approach, the required flexibility would be obtained by mounting the elements individually with a separation between.

A keypad employed in the chip card may be switch-less for simple readout of one data item, or may comprise a switch for allowing the user to scroll down three fixed sets of data. The keypad may also comprise an alphanumeric keypad to allow the user to enter and retrieve data based on a menu shown on the display. The chip card may also be configured with a microphone and/or voice recognition software so that data or commands may be input by audio means.

Battery Selection

Various battery systems may be used in the practice of the present invention. However, the batteries employed are preferably of a type that do not require venting, which in turn improves the tamper resistance of the chip card. The use of thin film batteries equipped with solid state electrolytes such as LiPON is especially advantageous in this respect, because batteries of this type can be made which do not require venting and which have various other advantages as described below.

Thin Film Battery Substrates

In a thin film battery, the components of the battery, including the current collectors, cathode, anode, electrolyte, and protective coatings, are all deposited on a substrate using standard sputtering and/or evaporation techniques. For this reason, thin film batteries can be fabricated on virtually any substrate, including substrates comprising plastic, silicon, metals, and glass. Indeed, thin film batteries may even be formed on the ceramic surfaces of a chip module. Hence, thin film batteries can be readily incorporated into various chip card designs in accordance with the present invention. Thin film batteries can also be made with a wide range of dimensions. Thus, for example, thin film cells can be made having areal dimensions of 0.5 to 25 cm. Consequently, the use of thin film batteries in the chip cards of the present invention adds little in the way of design constraints.

Advantages of Thin Film Batteries

The use of thin film batteries in the present invention offers a number of advantages over the use of conventional batteries. In particular, thin film batteries have long cycle lives, with thousands of discharge cycles per life. They also exhibit long shelf lives, often with little or no measurable change in their parameters even after years of storage. Thin film, batteries operate over a wide temperature range; thus, thin film batteries have been shown to perform reliably in temperature cycle tests carried out between 25° C. to 100° C., and both lithium-ion and lithium-free thin film batteries can be heated to 250° C. prior to initial charging with no discernable change in performance. Thin film batteries are also rechargeable, and therefore do not have to be any larger than the size required to supply the requisite power and energy for a single duty cycle. Thin film batteries may also be charged at high current densities, resulting in short recharge times. While the recharge time depends strongly on the resistance of the battery and its capacity, thin film batteries having $LiCoO_2$ cathodes have been made which recharge to greater than 90% capacity in only 6 minutes. Other attributes of thin film batteries, as well as thin film battery designs and methods for making them, are described, for example, in U.S. Pat. No. 5,314,765 (Bates, U.S. Pat. No. 5,445,906 (Hobson et al.), U.S. Pat. No. 5,569,520 (Bates), and U.S. Pat. No. 5,705,293 (Hobson).

Thin film batteries may be constructed or selected to meet the particular performance requirements of the chip card into which it is incorporated. For example, in thin film batteries, there is typically a trade-off between power and energy, the former involving high discharge rates and low cathode utilization, and the later involving low discharge rates and high cathode utilization. Hence, a thin-film battery may be selected with the degree of maximization of power or energy that makes the most sense for the application at hand.

LiPON Batteries

As noted above, one particular type of thin film battery that is especially suitable for use in the present invention makes use of an effective glass/ceramic solid-state electrolyte called amorphous lithium phosphorous oxynitride or "LiPON". The LiPON electrolyte separates the reactive electrodes (which may be, for example, metal film layers such as lithium and vanadium oxide film layers), enabling conversion of the battery's chemical energy into electrical energy. LiPON can be formed through rf magnetron sputtering of $Li_3PO_4$. A typical LiPON composition is $Li_{2.9}PO_{3.3}N_{0.36}$. Some of the physical properties of LiPON are described in X. Yu, J. B. Bates, G. E. Jellison Jr., and F. X. Hart, "A Stable Thin-Film Electrolyte: Lithium Phosphorous Oxynitride", J. Electrochem. Soc. Vol. 144, p. 524 (1997).

Material Choices for Battery Components

Various other materials may also be used as the cathode, anode and electrolyte elements in chip cards made in accordance with the present invention. Typically, the choice of materials for one component will be a significant factor in the choice of materials for the remaining components.

As noted above, the preferred electrolyte for use in the present invention is LiPON. However, other materials may also be used as the electrolyte, including, for example, oxysulfides.

Various materials may also be used for the anode in the thin film batteries employed in the present invention. These include, for example, lithium metal and n-doped electronically-conducting polymer membranes. Other suitable materials include $Sn_3N_4$, $Zn_3N_2$, $SnN_x$, $InN_x$ and SiTON (silicon-tin oxynitride, which has a typical composition of $SiSn_{0.9}ON_{0.9}$). These latter materials are sometimes referred to as lithium-ion materials since, during battery charging, lithium from the cathode (typically a material such as $LiCoO_2$) reacts with the anode material to produce conductive nanocrystalline domains of Li—Sn alloy in an amorphous matrix of the anode material.

When the thin film battery is constructed with a Li-ion anode, the anode will typically be a sputter-deposited film of a metal oxide or nitride. It is usually necessary to cover this anode with a metallic anode current collector such as Ti. The use of lithium ion anode materials in a thin film battery is particularly advantageous in that these materials can withstand temperatures of up to 250° C. This allows thin film batteries based on them to be incorporated into integrated circuits by solder reflow and other convenient methodologies.

Nitride and oxynitride anode films of the type described above can be deposited by magnetron sputtering to thicknesses within the range of 0.01 to 1 um. Thus, for example, SiTON may be deposited by magnetron sputtering of $SnO_2$—$SiO_2$ in an $N_2$ atmosphere. $SnN_x$ films, in which x is typically in the range of 0 to about 1.33, may be deposited by reactive sputtering of Sn in an $Ar/N_2$ atmosphere. $InN_x$ films, in which x is typically in the range of 0 to about 1, may be deposited by reactive sputtering of In in an $Ar/N_2$ atmosphere.

Various materials may also be used for the cathode in the thin film batteries employed in the present invention. These include, for example, $LiCoO_2$, $LiMn_2O_4$, $Li_xMn_{2-y}O_4$, and $V_2O_6$. These materials may be crystalline (as in the case of $LiCoO_2$, $LiMn_2O_4$ and $V_2O_6$), nanocrystalline (as in the case of $Li_xMn_{2-y}O_4$) or amorphous (as in the case of $V_2O_6$).

Thin film batteries having a crystalline $LiCoO_2$ cathode are particularly useful in chip cards requiring current densities greater than about 50 uA/cm$^2$. The $LiCoO_2$ film in such batteries may be deposited by magnetron sputtering of $LiCoO_2$ followed by annealment at 700° C. for about 2 hours. The use of such a cathode with a Li anode and a LiPON electrolyte is particularly advantageous. In such batteries, greater than 50% of the cathode is utilized at continuous discharge rates of more than 3 mA/cm$^2$, with resistance being dominated by the LiPON electrolyte. These batteries are further advantageous in that they can be connected, in either series or parallel, to make batteries with higher voltages and/or capacities, they can be cycled thousands of times with little loss in capacity, they are capable of supplying high pulse currents, they can operate at low temperatures, and they can be recharged to greater than 90% capacity in less than 20 minutes.

On the other hand, thin film batteries having a nanocrystalline $Li_xMn_{2-y}O_4$ cathode are particularly useful in chip cards requiring current densities lower than about 50 uA/cm$^2$. Since the cathodes in these batteries may be deposited at ambient temperatures through magnetron sputtering of $LiMn_2O_4$ and do not typically require annealment, and since the anode materials and electrolyte may also be deposited at low temperatures, these batteries may be formed on a wide range of low-melting substrates such as plastics and polymers. Hence, batteries of this type are applicable in a wide range of end uses, and can be applied to a large variety of substrates that are desirable in chip card applications.

"Lithium free" thin film batteries may also be used in the chip cards of the present invention. These batteries are fabricated with only an anode current collector and a protective coating. When the battery is initially charged, a metallic lithium anode is reversibly plated in place at the current collector. The anode current collector, which is typically a metal such as Cu, must usually be covered by an overlayer film of LiPON electrolyte or parylene. Batteries of this type have high heat resistance and may be heated to 250° C. after their initial fabrication without significantly effecting their performance.

Construction of a Thin Film Battery

Figure 2:
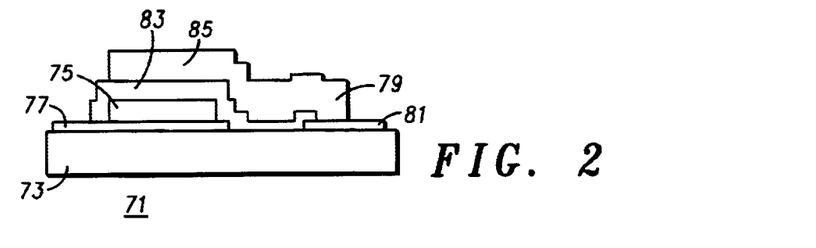
FIG. 2 is a schematic diagram of a thin film battery suitable for use in the present invention.

FIG. 2 illustrates the construction of a thin film battery that may be used in the chip cards of the present invention. The thin film battery 71 includes a substrate 73 which supports a cathode 75 (and an associated cathode current collector 77) and an anode 79 (and an associated anode current collector 81). The anode and cathode are in electrical contact with each other by means of an electrolyte 83. The anode, cathode and electrolyte are enclosed in a sealed unit by means of the substrate and a protective coating 85. The protective coating is depicted here as having a single layer construction, though one skilled in the art will appreciate that multi-layer construction may be used as well. The whole assembly typically has a profile of about 15 um, not including the thickness of the substrate.

Methods for Making Thin Film Batteries

Figure 3:
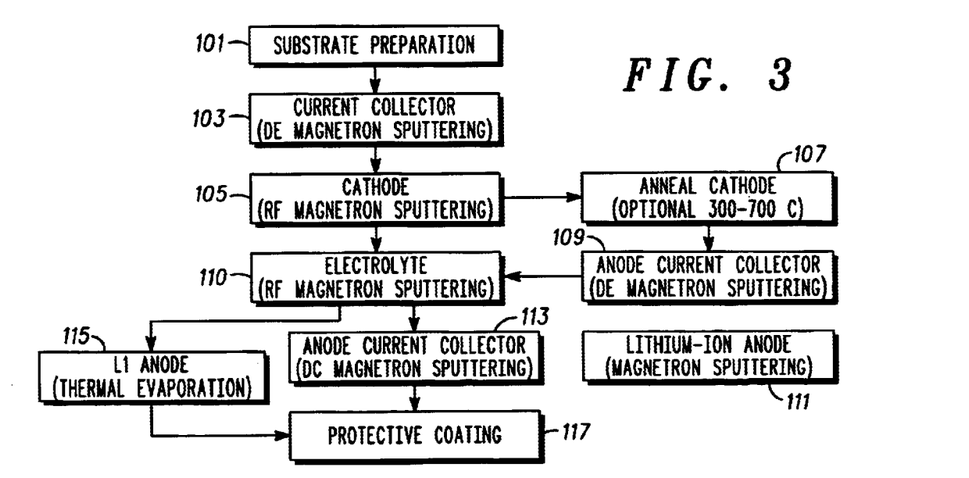
FIG. 3 is a flow chart illustrating a methodology suitable for making thin film batteries for use in the present invention.

FIG. 3 illustrates the details of one particular process by which a thin film battery (in this case, a LiPON battery) suitable for use in the present invention can be made. It will be appreciated that this process can vary substantially depending, for example, on the particular materials being used and the specific features the battery is required to have. It will also be appreciated that other methods of battery fabrication may be used in conjunction with the present invention.

A substrate upon which the battery is to be deposited is provided, and is prepared 101 appropriately for battery deposition. The manner of preparation will depend in part on the choice of materials for the substrate and the battery components. However, the preparation step may involve such measures as use of a primer, exposure to a solvent, or plasma etching.

Once the substrate is prepared, the current collector is deposited 103 onto the substrate, typically by dc magnetron sputtering. Useful materials for the current collector include, for example, Pt and Ni. Next, the cathode is deposited 105, typically by rf magnetron sputtering or by e-beam vaporization. The cathode may be a material such as $LiCoO_2$, $LiMn_2O_4$ or $V_2O_5$ and may be crystalline, nanocrystalline, or amorphous. If it is desired to crystallize the cathode, the cathode may be annealed 107 by passing it through an oven which is typically heated to a temperature within the range of 300–700° C., after which the anode current collector may be deposited 109 through dc magnetron sputtering or by other suitable means. The LiPON electrolyte is then deposited by rf magnetron sputtering of $Li_3PO_4$ 110, followed by formation of the anode 115. In the case of a lithium metal anode, the anode may be formed through thermal evaporation of lithium metal or another suitable means. After the anode is formed, a protective coating, such as parylene/Ti, may be placed over the assembly 117. The coating may be a single layer coating, but is preferably a multilayer coating.

Several variations in this methodology are possible. In one such variation, the electrolyte is deposited immediately after cathode formation, followed by application of a lithium ion anode in a subsequent magnetron sputtering step 111. The sputtering step may utilize, for example, $SnO_2$—$SiO_2$, Sn, Zn or In. An anode current collector is then deposited through dc magnetron sputtering 113, followed by application of the protective coating.

For the purposes of the present invention, the deposition rates of the thin film battery components can vary and are not particularly limited. However, in a typical process involving a two inch target, a film deposition rate of about 600 angstroms/min will be used for a Pt or Ni current collector, while a rate of greater than 100 angstroms/min will typically be used for deposition of the cathode and electrolyte materials. The anode material will typically be deposited at about 1800 angstroms/min in the case of a lithium metal anode, or about 100 angstroms/min in the case of a lithium ion anode made from a material such as SiTON. The parylene/Ti coating will typically be deposited at a rate of about 900 angstroms/min.

The performance characteristics of thin film batteries can vary widely and will depend, for example, on the materials selected for the cathode and anode, the area and thickness of these materials, and the operating temperature of the battery.

The cathode material and the deposition and processing methods used to prepare the cathode film will determine the operating voltage range, capacity, specific power, specific energy, cycle life and performance at elevated temperatures.

Memory Types

Various types of memory and memory devices may be used in the chip cards of the present invention. The memory employed in a card may be volatile, nonvolatile, or a combination of the two. For instance, the data stored on a card may be segregated into confidential and non-confidential data, with the former being stored in volatile memory and the later being stored in non-volatile memory. Such a configuration is advantageous in that the card can be configured for rapid purging of the volatile memory in the event that the card is tampered with (e.g., if there is an interruption in power supply to the volatile memory).

Nonvolatile memory types useful in the chip cards of the present invention include ROM, PROM, EPROM, and EEPROM.

Volatile memory types useful in the chip cards of the present invention include Random Access Memory (RAM) such as Dynamic Random Access Memory (DRAM) or Static Random Access Memory (SRAM). The use of SRAM is particularly preferred in the chip cards of the present invention. SRAM is a type of memory that is faster and generally more reliable than the more common DRAM. As the term "static" implies, this type of memory does not need to be refreshed like DRAM. While DRAM commonly supports access times of about 60 nanoseconds, SRAM can give access times as low as 10 nanoseconds using current technology. In addition, the cycle time for SRAM is much shorter than that of DRAM because it does not need to pause between accesses.

Card Materials

Various materials may be used in the chip card constructions of the present invention. Some non-limiting examples of these materials include polyesters, such as polyethylene terephthalate (PET), polyethylene naphthalate (PEN), polyvinyl chloride (PVC), acrylonitrile-butadiene-styrene (ABS), and blends, mixtures or copolymers of the foregoing. The present invention also contemplates the use of inter-penetrating polymer networks in the card constructions described herein, in light of the advantageous properties obtainable with this class of polymers. Preferably, the materials used in the card construction are selected so that the resulting construction complies with ISO 7816, which governs, among other things, the physical characteristics of the card materials, including such parameters as temperature tolerance and flexibility.

In a typical construction, a substrate is provided on which the components of the card are placed. The substrate may comprise a single layer or multiple layers of various materials such as the aforementioned polymers. While this substrate is not particularly limited in its dimensions, a thickness of 4–6 mils is found useful in many applications.

Inks, Logos

The chip cards of the present invention may be provided with various designs, emblems, logos, pictures, printed indicia, and other such adornments as may be desired by the card issuer or end user. These adornments may be two or three dimensional, and may be designed to improve the aesthetic appeal of the card, to convey information, for advertising purposes, to identify the card issuer or user, to provide a certificate of authenticity, or to protect against fraud or duplication by an unauthorized party.

Dimensions of Cards

The dimensions of chip cards made in accordance with the present invention are not particularly limited, and will be dictated in part by the end use to which the card is put. Preferably, however, the card will have dimensions complying with international standard ISO 7816, which defines the standard size of most credit cards. Such a size makes the chip card convenient to carry in most conventionally sized wallets, pockets, purses, and billfolds.

Communications Protocols

Various protocols may be used in the communications between the chip card and a reader used to extract data from, or impart data to, the chip card. Typically, however, the protocol used will be that specified by international standard ISO 7816 or by other such standards as may be adopted by the industry.

End Uses

The chip cards of the present invention may be employed in a wide variety of end uses. For example, the cards may be used as prepaid cards that are provided with an initial balance at the time of purchase or issuance. Deductions from the balance can then be made for each use. Such prepaid cards may be used, for example, in copying machines, pay phones, car washes, gambling machines, cinemas, laundromats, retail outlets, gas stations, restaurants, as food stamps, and in other such instances where cash would otherwise be used. Chip cards are advantageous in these situations because they provide the issuer or purchaser with a cost control measure for miscellaneous expenses, while freeing the carrier from the need to carry cash for the expenditures covered by the card. The use of chip cards also facilitates accounting, due to the ease with which electronic records may be generated.

The chip cards of the present invention may also be used for security purposes. For example, these cards may be used as a means of identification, or to gain access to restricted areas or services. For example, the chip cards of the present invention may be used as access keys for communications systems such as the Global System for Mobile Communications (GSM) in Europe. In the GMS system, a user is issued a card which can be inserted into any GMS telephone, thereby converting the phone into the user's own personal phone system (for security purposes, the user is also typically required to input a Personal Identification Number (PIN) before the card will activate the telephone). Subsequent to activation, calls to the user's personal phone number will be routed to the GMS phone as long as the phone remains activated. The chip cards of the present invention may also be used in a somewhat similar manner as access keys for satellite or cable television descramblers, for the receipt of subscription or pay-per-view programming, and for the use or rental of software. In these various applications, the chip card may make advantageous use of radio frequency identification devices and methodologies, as described, for example, in U.S. Ser. No. 08/705,043, filed Aug. 29, 1996.

The chip cards of the present invention may also be used as a means to maintain and/or access personal records, such as medical records. For example, a chip card may be used to store personal medical records for rapid retrieval by medical personnel in the event that its carrier is involved in an accident or suffers a personal injury. Such cards may be advantageously issued to persons suffering from chronic medical conditions such as epilepsy, hemophilia, diabetes or AIDS, and may contain information, such as blood type, allergies, and prescription data, that would enable the prompt administration of appropriate medical services.

Data Access Methodologies

The chip cards of the present invention may be designed such that the data stored on them may be accessed in different ways. For example, some information, such as the card serial number, the card manufacturer, and the original number of units placed on the card, may be stored in a read-only format, while other information may be capable of being read or modified. Still other information may be formatted such that it can never be directly accessed.

Access to the data on the card may also be controlled. For example, if the card is used as a telephone card, it may be configured such that units can be subtracted from the card, but no units can be added to the card. If the card is used for medical purposes, general access may be given to certain information on the card, such as blood type or the patient's name, while more restricted access is given to more sensitive data such as insurance information or the carrier's medical history. Access controls may be built into the card to determine who can access the information on the card, and how the information on the card can be accessed (e.g., whether the data on the card can be read, modified, augmented, or erased). Such access controls may include, for example, the use of passwords or PIN numbers, or the employment of ciphering or encryption algorithms or keys. When passwords or PIN numbers are used, these passwords or PIN numbers may be known only to the card carrier, to selected groups (e.g., medical personnel), or to the card reader.

Adhesives and Fasteners

In the event that the chip card of the present invention is constructed from two or more components or layers, the components or layers may be joined together by a variety of means. Such means may include, for example, use of glues or adhesives, the use of thermal or alter sonic welding, or the employment of mechanical fastening means as are known to the art.

Embedded Battery System

As previously noted, one common method of tampering with smart cards involves isolating the chip module by removing the surrounding card material from it, and then stripping the epoxy used to encase the chip module through treatment with fuming nitric acid followed by acetone. In one aspect of the present invention, chip cards are fashioned which utilize the highly conductive nature of nitric acid to effectively thwart this approach.

In particular, in accordance with this aspect of the present invention, the conductive elements which connect the battery to the memory device may be encapsulated with the same or similar epoxy that is used to encapsulate the chip module. Consequently, if nitric acid is applied to the chip module in an attempt to remove the epoxy resin from it, the acid will remove the epoxy from the conductive elements as well. Since nitric acid is highly conductive, this will short circuit the battery, thereby interrupting the power supply to the chip module. Therefore, if the chip module utilizes a volatile memory source such as SRAM for any sensitive information stored on the card, that information will be wiped clean before the chip module can be subjected to microprobing experiments.

Preferably, the conductive elements in these embodiments of the present invention are spaced in sufficient proximity to each other in the vicinity of the chip module so that treatment of the chip module with nitric acid will result in the exposure of the conductive elements to the acid as well. The conductive elements are also preferably spaced in such a way that the epoxy resin cannot be removed piecemeal from the chip module without causing a short circuit.

Several variations of these embodiments are possible which are useful in thwarting attacks that involve the use of nitric acid or other electrically conductive acids or solvents.

For example, while it is preferred to encapsulate both the chip module and the conductive elements in an epoxy resin, and preferably in the same epoxy resin, one skilled in the art will appreciate that other materials may be used to encapsulate the conductive elements and/or the chip module, so long as those materials have the appropriate dielectric properties required of an encapsulant and have similar solubilities in nitric acid or in other electrically conductive acids or solvents that would typically be used to expose the surfaces of the chip module in a tampering scheme.

Figure 4:
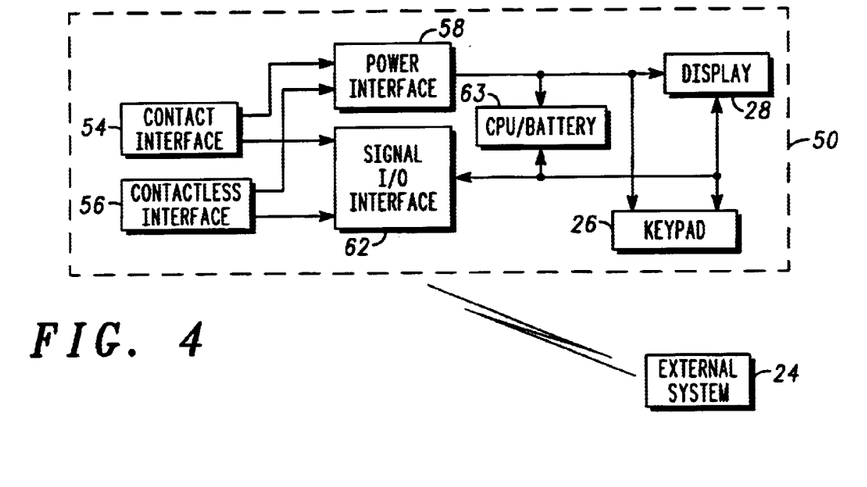
FIG. 4 is a schematic diagram of a second embodiment of a chip card made in accordance with the present invention.

Thin film batteries may be advantageously employed in this aspect of the invention. As noted above, thin film battery systems may be fabricated on virtually any substrate, including substrates comprising silicon. Thus, for example, the battery may be disposed or embedded on one or more surfaces of the chip module, or may be incorporated into the chip module. This type of construction is depicted schematically in FIG. 4, where the chip module/battery combination is depicted as element 63 (the remaining elements in this figure are identical to those of FIG. 1). By placing the power source in or on the chip module, either of these constructions increases the likelihood of power interruption if the device is tampered with, resulting in the purging of the volatile memory units.

Those embodiments in which the thin film battery (or batteries) is disposed on one or more surfaces of the chip module are advantageous in that the module will be difficult to mechanically probe without damaging the battery and causing a short or disruption of the power supply. In some of these embodiments, each of the major surfaces of the chip module may have a thin film battery disposed thereon which, in addition to being a power source, may act as a shield against laser ablation, microsurgery, or other such techniques as may be used to tamper with the card.

Charging Circuit

According to another aspect of the present invention, the media cipher smart card employs a low cost battery charging circuit for charging the embedded battery. The charging circuit of the present invention employs a trickle charge to charge the lithium phosphorus oxynitride battery by using existing five volt logic and digital circuit elements. The charging circuit is both small in size and low in cost and fits in an ISO-7816 compliant smart card.

Figure 6:
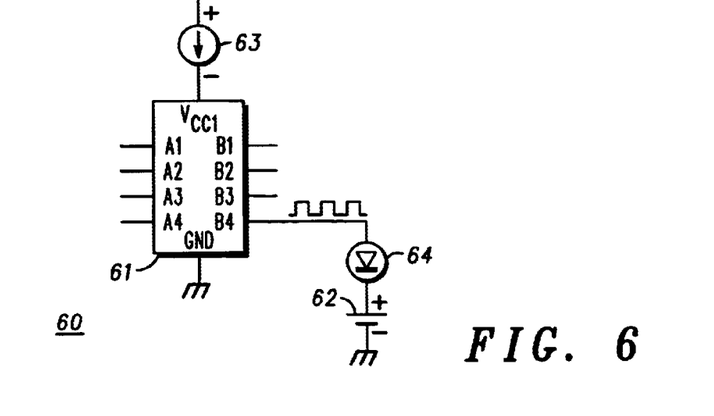
FIG. 6 depicts an exemplary embodiment of a circuit for trickle charging the smart card battery according to another aspect of the present invention.

FIG. 6 depicts an exemplary embodiment of a charge circuit 60, which is a digital circuit that employs an output port from a micro controller 61 to trickle charge a battery 62, which is normally a task for an analog circuit. As a micro controller 61 already exists in the smart card, the micro controller port can be used to charge the battery 62 without requiring additional circuitry. Moreover, the charge circuit 60 can then be completely implemented in software, enabling the unique requirements for each battery type to be set in software. Thus, when the micro controller 61 is coupled to an external power source 63, the micro controller places itself in the trickle charge state and outputs a digital pulse from one of its output ports to the battery 63. The micro controller 61 includes an interface to an external power source, such as a DC power source, or an AC power source that is converted to a DC power output signal.

Figure 5:
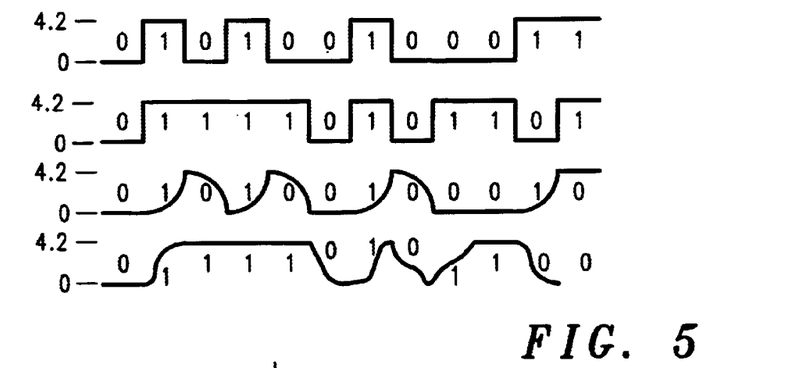
FIG. 5 depicts two exemplary embodiments of idealized waveforms and their corresponding actual waveforms used in trickle charging the battery from the micro controller according to one aspect of the present invention.

Turning to FIG. 5, the charger 60 employs a pseudorandom pulse to charge the battery, thereby enabling the electromagnetic emissions to help mask the operation of the micro controller to prevent or make more difficult current profiling by hackers, which is a technique used to access a smart card's information without permission. The emissions created by a pseudorandom sequence of pulses tends to be relatively flat across the frequency of interest. The emissions from other portions of the logic tend to be specific to particular frequency bands. By combining the two types of emissions, the frequency dependent emissions tend to become more difficult to isolate, thereby at least partially masking these emissions.

FIG. 5 shows two versions of idealized digital signals being output by the micro controller used in the exemplary embodiment of FIG. 6. The actual pulses that reach the battery are depicted below, as the rise (and fall) times from 0 volts to 5 volts (and from 5 volts to 0 volts) is nonzero. These small pulses are sufficient to trickle charge a small thin film battery as described herein.

The media cipher smart card system may incorporate a rechargeable LiPON battery with a capacity on the order of 100 $\mu$Ahr. The battery will be charged when inside of a set top box. The method of charging is to trickle charge the battery using a port of the micro controller of ASIC itself. The output of the micro controller or ASIC port is a pulse that will trickle charge the battery using a duty factor that, when the capacitance of the battery is taken into account, does not exceed the maximum charging voltage of 4.2 volts as the voltage slews up. The voltage of the pulse if allowed to slew all of the way up would reach 5.0 volts, however, this is not permitted.

In FIG. 5, the pulses must not have a total duty that will allow the voltage to reach 5V. Thus, the pulses are shown as limited to 4.2 volts. Another limit may suffice, depending upon the frequency of the duty cycle, the battery capacity and voltage, and other factors. A series of pulses back-to-back, i.e., 11 instead of 10 will allow this to happen. In other words, if the time of a single pulse is chosen to have the duty cycle to allow the voltage at the battery to slew up to 4.2V, a sequence like 10100101000101001 is acceptable but 10100101100111001 is not because the sequences 11 and 111 are present. The second sequence would be acceptable only if the time to execute 111 is less than the slew rate of the battery, i.e., a higher frequency is used. This allows adjustment of the duty cycle that the battery sees. Thus, to permit random sequences that would include long repetitive sequences of 1s, a higher frequency must be employed to prevent reaching the full 5.0 volt potential.

By sending a digital signal to the battery in a series of short random pulses, the microprocessor performs a trickle charging of the battery without requiring analog circuitry. This enables the processing and associated electronics of the smart card to consist entirely of digital circuits, and therefore occupy very little real estate on the card. Given the rather small size of the battery, the digital pulses output from the microprocessor are sufficient to charge the battery at least in a trickle charge manner.

The battery 62 is preferably connected to the microprocessor through a diode 64. Thus, as shown in FIG. 6, a diode 64 is connected between the battery 62 and the microprocessor 61 with the cathode end of the diode 64 connected to the battery 62. This prevents the microprocessor 61 from shorting the battery 62 low when a low signal is present.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of devices, others may suffice. Moreover, while some of the embodiments describe specific types of materials, and batteries other types may be employed by the invention described herein. Furthermore, these examples should not be interpreted to limit the modifications and variations of the invention covered by the claims but are merely illustrative of possible variations.

What is claimed is:

1. A chip card comprising:
   a battery;
   an external power source input for coupling to an external power source; and
   a microprocessor being coupled to the external power source input and to the battery, said microprocessor trickle charging the battery when an external power source is coupled to the external power source input.

2. The apparatus according to claim 1, wherein the microprocessor includes at least one digital output port, which is coupled to the battery.

3. The apparatus according to claim 2, wherein the microprocessor transmits a series of digital pulses to the battery when the external power source is coupled to the external power source input.

4. The apparatus according to claim 3, wherein the microprocessor transmits a pseudorandom sequence of digital pulses to the battery when the external power source is coupled to the external power source input.

5. A method for charging a battery comprising:
   coupling the battery terminals to a microprocessor output port; and
   transmitting a digital signal to the battery from the microprocessor port when the microprocessor is powered from a power source other than the battery.

6. The method according to claim 5, further comprising transmitting a pseudorandom sequence of digital pulses to the battery.

7. The method according to claim 5, wherein the battery comprises a thin film battery with a solid electrolyte.

8. The method according to claim 5, further comprising connecting the terminals of the battery directly to the microprocessor output port without intermediate devices.

9. The method according to claim 5, further comprising connecting the terminals of the battery directly to the microprocessor output port through a diode.

10. A chip card comprising:
    a thin film battery having a solid-state electrolyte, wherein said battery is hermetically sealed within the card;
    a volatile memory unit;
    an external power source input for coupling to an external power source; and
    a microprocessor being coupled to the external power source input and to the battery, said microprocessor trickle charging the battery when an external power source is coupled to the external power source input.

11. The chip card according to claim 10, wherein said electrolyte comprises lithium phosphorus oxynitride.

12. The chip card of claim 10, wherein the battery comprises a lithium anode having a layer of lithium phosphorus oxynitride thereon.

13. The chip card of claim 10, wherein the battery is in electrical contact with said volatile memory unit by way of first and second conductive elements, said first and second conductive elements being of opposite polarity, wherein said volatile memory unit is encapsulated in an epoxy resin, and wherein said first and second conductive elements are also encapsulated in an epoxy resin in the vicinity of said volatile memory unit.

* * * * *

UNITED STATES PATENT AND TRADEMARK OFFICE
CERTIFICATE OF CORRECTION

PATENT NO. : 6,758,404 B2
DATED : July 6, 2004
INVENTOR(S) : Stephen Joseph Ladyansky It is certified that error appears in the above-identified patent and that said Letters Patent is hereby corrected as shown below:

Column 4,
Line 67, before "such places" change "another" to -- other --.

Column 5,
Line 61, after "film", delete -- , --.
Line 66, before "change", change "discernable" to -- discernible --.

Column 6,
Line 9, after "5,314,765", change "(Bates," to -- (Bates), --.
Line 15, before "incorporated", change "it is" to -- they are --.
Line 18, before "involving", change "later" to -- latter --.

Column 8,
Line 29, change "$V_2O_5$" to -- $V_2O_6$ --.

Signed and Sealed this

Ninth Day of August, 2005

JON W. DUDAS
*Director of the United States Patent and Trademark Office*